United States Patent
Tan et al.

(10) Patent No.: US 8,571,366 B2
(45) Date of Patent: Oct. 29, 2013

(54) PROXIMITY FREE SPACE OPTICAL INTERCONNECT

(75) Inventors: Michael R. T. Tan, Meno Park, CA (US); Paul K. Rosenberg, Sunnyvale, CA (US); Sagi V. Mathai, Berkeley, CA (US); Moray McLaren, Bristol (GB); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 321 days.

(21) Appl. No.: 12/991,644

(22) PCT Filed: May 9, 2008

(86) PCT No.: PCT/US2008/006042
§ 371 (c)(1),
(2), (4) Date: Dec. 14, 2010

(87) PCT Pub. No.: WO2009/136899
PCT Pub. Date: Nov. 12, 2009

(65) Prior Publication Data
US 2012/0039562 A1    Feb. 16, 2012

(51) Int. Cl.
*G02B 6/26* (2006.01)
*G02B 6/42* (2006.01)

(52) U.S. Cl.
USPC .................. 385/52; 385/14; 385/56

(58) Field of Classification Search
USPC ............... 385/14, 49, 50, 52, 56–59
See application file for complete search history.

(56) References Cited

U.S. PATENT DOCUMENTS

| | | | | |
|---|---|---|---|---|
| 5,555,332 | A | * | 9/1996 | Dean et al. ............. 385/53 |
| 5,778,123 | A | * | 7/1998 | Hagan et al. ........... 385/76 |
| 5,790,733 | A | * | 8/1998 | Smith et al. ............ 385/88 |
| 6,102,582 | A | * | 8/2000 | Espindola et al. ...... 385/57 |
| 6,520,686 | B1 | * | 2/2003 | Kiani ..................... 385/54 |
| 6,526,205 | B1 | | 2/2003 | Wilson |
| 6,799,897 | B2 | | 10/2004 | Sherrer |
| 6,810,160 | B2 | | 10/2004 | Sugama et al. |
| 7,039,265 | B2 | | 5/2006 | Levy et al. |
| 7,118,285 | B2 | | 10/2006 | Fenwick et al. |
| 7,251,388 | B2 | | 7/2007 | Morris et al. |
| 2003/0007740 | A1 | | 1/2003 | Sherrer |

FOREIGN PATENT DOCUMENTS

| | | |
|---|---|---|
| JP | 54-039060 | 3/1979 |
| JP | 58-186712 | 10/1983 |
| JP | 5-031150 | 4/1993 |

(Continued)

OTHER PUBLICATIONS

Hewlett-Packard Development Company, PCT International Search Report, PCT/US2008/006042, Report dated Feb. 10, 2009.

*Primary Examiner* — Daniel Petkovsek

(57) ABSTRACT

A system employs a flexible optical media, two connectors, and a mechanism such as a magnet that brings the connector together when the connectors are close to each other. The optical media is able to guide optical signals, and one connector is attached to an end of the optical media. Each connector also has alignment features and provides paths for the optical signals. The alignment features of each connector are shaped to mate with the alignment features of the other connector and to shift the connectors relative to each other as the mechanism pushes the connector together. The alignment features further have seated positions at which the paths in one connector are aligned with the paths in the other connector and separated by a free space gap.

13 Claims, 5 Drawing Sheets

(56) References Cited

FOREIGN PATENT DOCUMENTS

| JP | 5-157943 | 6/1993 |
| JP | 9-005580 | 1/1997 |
| JP | 2000-505208 | 4/2000 |
| JP | 2000-199833 | 7/2000 |
| JP | 2000-275464 | 10/2000 |
| JP | 2001-116962 | 4/2001 |
| JP | 2002-182088 | 6/2002 |
| JP | 2002-258081 | 9/2002 |
| JP | 2004-029633 | 1/2004 |
| JP | 2008-191187 | 8/2008 |

* cited by examiner

PROXIMITY FREE SPACE OPTICAL INTERCONNECT

BACKGROUND

High data rate signal transmission is a concern in many computing systems. Current server systems, for example, often use a set of user-selected components that need to communicate with each other at high data rates. In a computer server system designed with a modular architecture incorporating individual printed circuit board (PCB) 'blades', for example, the blades, e.g., server blades and storage blades, are mounted in a common enclosure and share system components such as cooling fans, power supplies, and enclosure management. For the blades to work together and provide the desired data storage, processing, and communications, the server system needs to provide high data rate communication channels for communications among blades and external devices. Presently, blades and I/O devices in blade-type computer servers are commonly interconnected via high speed electrical connectors attached to a backplane or midplane PCB. This architecture creates signal integrity challenges since high frequency electrical signals may need to transit tens of inches of lossy copper traces, multiple PCB vias, and two or three electrical connectors before the signals reach their destinations. In addition, the backplane or midplane can block the flow of cooling air through the server enclosure, which increases the power required to cool sensitive electronic circuits. Current electrical interconnection systems also limit server design flexibility since blades typically must be inserted parallel to the axis of the connector pins, typically, in a direction from front to back.

Communication channels using optical signaling can avoid many of the problems associated with high frequency electrical signals, but guided optical signaling may require complex or cumbersome systems for reliably aligning and connecting optical cables or ribbons. For example, a typical optical fiber coupler must align the axes of fibers being coupled and bring the ends of the fibers into contact with each other. Further, systems containing circuit boards that use optical signaling generally produce or receive optical signals at an edge of the boards where an optical cable or fiber can be connected. Having optical components at the edge of a board has disadvantages in that electrical signals that may still need to run the length of the board and may be subject to signal loss and noise problems. Further, the available space at the edge of a circuit board or a server blade is limited, and fiber connectors and the optical fibers extending from the edge of the board must often compete for space with electrical sockets and cables. Accordingly, better systems and methods for economically and efficiently establishing and maintaining optical communication channels in systems such as servers are desired.

SUMMARY

In accordance with an aspect of the invention, a system includes an optical media, a first connector, a second connector, and a mechanism that pushes the first connector into contact with the second connector when the connectors are close to each other. The first optical media is flexible and able to guide optical signals, and the first connector is attached to an end of the first optical media. The first connector also has first alignment features and provides first paths for the optical signals. The second connector has second alignment features and also provides second paths for the optical signals. The first alignment features are shaped to mate with the second align features and to shift the first connector relative the second connector as the mechanism pushes the first connector toward the second connector. The first alignment features and the second alignment features further have a seated position at which the first paths are aligned with the second paths and separated by a free space gap.

BRIEF DESCRIPTION OF THE DRAWINGS

Use of the same reference symbols in different figures indicates similar or identical items.

DETAILED DESCRIPTION

In accordance with an aspect of the invention, optical communication channels between substantially parallel systems such as circuit boards or server blades plugged into slots in a mother board or other base or chassis can be established directly across a gap that is perpendicular to the systems. Accordingly, shorter signal lines can be used for high frequency electrical signals in the systems and the optical connections can be kept away from edge sockets that are use for connection of external devices. In an exemplary embodiment, optical ribbons or other flexible multi-channel optical media connect the adjacent systems respectively to a pair of connectors. The two connectors employ mated features that are shaped to shifts the connectors laterally to automatically bring the free space optical channels into alignment as the connectors are pushed together. Magnets can provide the necessary force for alignment and for keeping the connectors together, while still permitting easy disconnection of the connectors. The connectors that are thus passively self-aligned, and multiple optical signals can be transmitted through a free space gap between the connector halves. Since the connectors in the optical interconnect are at the ends of flexible optical media, the free space proximity optical interconnect can maintain optical signal alignment even when the connected systems are subject to misalignment, vibrations, and differential thermal expansion.

Figure 1:
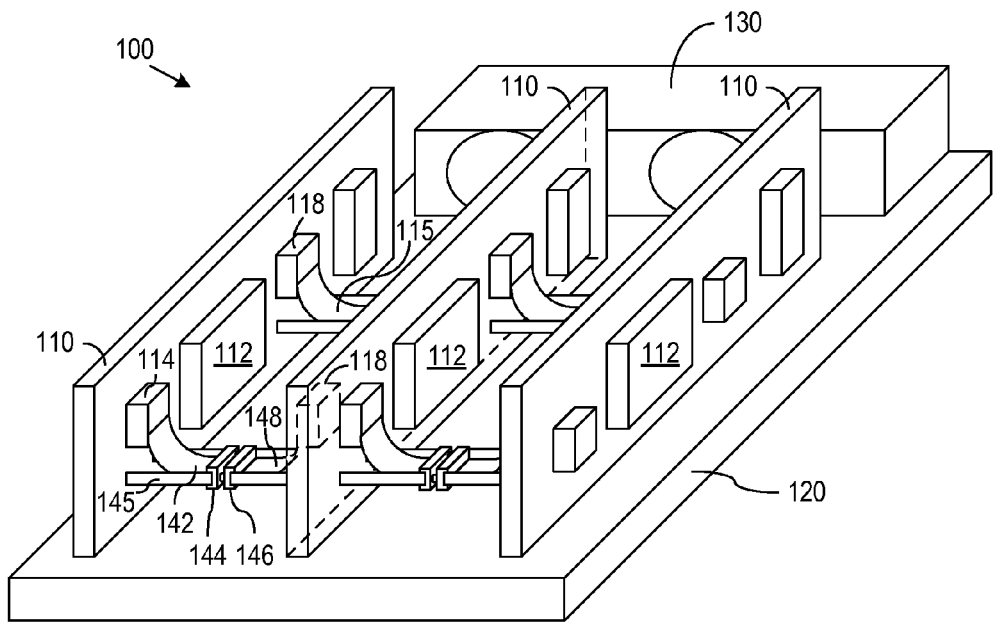
FIG. 1 shows a server system in accordance with an embodiment of the invention employing free space proximity optical interconnects in accordance with an embodiment of the invention.

A free space proximity optical interconnect can provide high bandwidth connectivity between adjacent printed circuit boards (PCBs) wherever communication channels are needed within a computer server or other system containing parallel PCBs. FIG. 1 shows a server system 100 in accordance with an embodiment of the invention using free space proximity optical interconnects for communications between blades 110 that are mounted parallel to each other on a server chassis 120. Additional components 130 such as power supply transformers and cooling fans can also be connected to server chassis 120, and the entire assembly would typically be contained in a shared enclosure (not shown). A user interface and sockets for external connections to server system 100 may be provided through the shared enclosure.

Some or all of blades 110 in system 100 may be substantially identical or of differing designs to perform different functions. For example, some blades 110 may be server blades or storage blades. Each blade 110 includes one or more subsystems 112 that implement the particular functions of the blade 110. Subsystems 112 may be mounted on either one or both sides of each blade 110 in the manner of components on a PCB, or blades 110 may include enclosures with subsystems 112 in the interior of the blade 110. Typical examples of such subsystems 112 include hard drives or other data storage and processor subsystems containing conventional computer components such as microprocessors, memory sockets, and integrated circuit memory. Subsystems 112 and the general features of blades 120 may be of conventional types known for server systems using blade architectures, such as the c-class architecture of server systems commercially available from Hewlett-Packard Company.

Each blade 110 additionally includes one or more optoelectronic (OE) engines 114 and 118. An OE engine 114 or 118 can be attached to a blade 110 wherever a high bandwidth connection to another blade 110 may be required. Each OE engine 114 or 118 may include both optical transmitters (e.g., a VCSEL array) and optical receivers (e.g., a photodiode array) or may include just optical transmitters or just optical receivers. Transmitters in OE engines 114 and 118 on each blade 110 encode in transmitted optical signals information derived from electrical signals in the blade 110, and receivers in OE engines 114 and 118 on each blade 110 convert received optical signals to electrical signals for use in the blade 110. In general, each OE engine 114 on a blade 110 is matched to transmit optical signals to and receive optical signals from an OE engine 118 via a free space proximity optical interconnect. In one specific implementation, OE engines 114 and 118 can be QXFP transceivers, which are available from Zarlink Semiconductor Inc, and such modules perform the function of four-channel OE engines operating at a data rate of 5 Gb/s per channel.

A free space proximity optical interconnect between an OE engine 114 on one blade 110 and an OE engine 116 on an adjacent blade 110 includes a flexible optical media 142 optically coupled to OE engine 114, a connector 144 at the opposite end of optical media 142, a connector 146 with features that mate with connector 144, and a flexible optical media 148 optically connecting connector 146 to OE engine 116. Optical media 142 and 148 are preferably high bandwidth flexible optical media such as parallel fiber ribbons or parallel polymer waveguides that carry the transmitted and received optical signals of OE engines 114 and 118, respectively. Individual optical fibers in fiber ribbons can be single-mode or multi-mode plastic, glass, or nanostructured fibers (e.g., Corning® ClearCurve™ optical fiber), which can accommodate a tight bend radius with little bend loss. The optical signals can employ wave division multiplexing (WDM) to increase bandwidth by encoding information in multiple frequency components of light that are transmitted along a single optical fiber or waveguide. In a dense arrangement, optical media 142 and 148 contain multiple parallel fibers or waveguides, and each fiber or waveguide carries a WDM signal to achieve a high bandwidth per unit area.

Each of connectors 144 and 146 contains optical systems and alignment features. The optical systems in each connector 144 or 146 are for the transmission of optical signals between guided propagation in optical media 142 or 148 and free space propagate in a gap defined by connectors 144 and 146. The alignment features are precision structures that mate as connectors 144 and 146 are pushed together and automatically align the optical systems in connector 144 with the optical systems in connector 146. In an exemplary embodiment, all that is required to make an optical connection between OE engines 114 and 116 is to insert adjacent blades 110 into server chassis 120. Magnets or a spring system (not shown) then push connectors 144 and 146 together so that the blind-mating functions of the alignment features align connectors 144 and 146 for free space optical transmissions. In a typical configuration for server system 100, there may be about 2 to 5 cm of free space between adjacent blades 110, and a standoff system 145 may be provided to position connectors 144 and 146 in close enough proximity for the magnetic attraction or spring action to push connectors 144 and 146 together and achieve alignment. Connectors 144 and 146 are not completely constrained in standoff system 145 but have sufficient freedom of motion in x, y, z, rotation, and tilt degrees of freedom to move into alignment with each other despite relative miss alignment of blades 110. In a typical server application, connectors 144 and 146, when separated, may be subject to translational misalignment on the order of about 500 to 2000 µm and angular misalignment of up to about 1.5° due to variations in the mechanical mounting of blades 110. Temperature variations, and/or mechanical vibrations, for example, from the operation of cooling fans or hard drives in server system 100 can cause blades 110 to have further variable lateral misalignment, variable separation, variable angular misalignment about to two tilt axes, and variable rotational misalignment. However, the applied force and the alignment features lock connectors 144 and 146 in a fixed relative position that is aligned for transmission of free space optical signals despite alignment variations else where in server system 100.

Figure 2A:
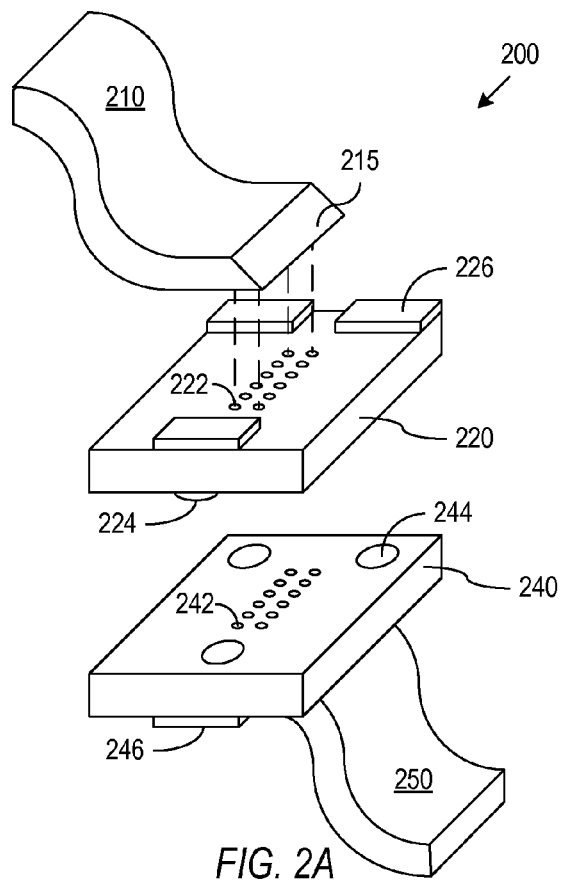
FIG. 2A shows a perspective view of a proximity couple optical interconnect in accordance with an embodiment of the invention.

FIG. 2A illustrates one configuration for connectors 220 and 240 that automatically align optical channels in a free space proximity interconnect 200. Connector 220 is at the end of optical media 210. In interconnect 200, optical media 210 is a flat optical ribbon that attaches parallel to a top surface of connector 220, and the end surface 215 of optical media 210 is cut or polished at an angle of 45° to the direction of light propagation in optical media 210. As a result, transmitted light from the waveguides or fibers in optical media 210 is reflected, e.g., by total internal reflection, into light pipes 220 that pass through connector 220. Similarly, surface 215 reflects light beams from light pipes 222 into respective fibers or waveguides in optical media 210. Alternatively, the end of optical media 210 could be perpendicular to the direction propagation of light in media 210, and the end of optical media 210 can be aligned to directly transmit light into and receive light from light pipes 222.

Connector 240 includes light pipes 242 that receive optical signals from and direct optical signals to an optical media 250. Optical media 250 can be substantially identical to optical media 210, and in particular can include an end (not shown) cut or polished at a 45° angle for reflection of optical signals passing between light pipes 242 and respective fibers or other waveguides in optical media 250. Alignment features 244 on connector 240 are holes that are precision machined, so that when alignment features 224 on connector 220 are properly mated in holes 244, light pipes 242 in connector 240 are aligned with light pipes 222 in connector 220. Alignment features 224 and 244 can be of any shape able to shift connectors 220 and 240 relative to each other and provide a predetermined separation between connectors 220 and 240 when alignment features 224 and 244 are in a seated position. In the illustrated embodiment, alignment features 224 are balls, but another example of a suitable shape for alignment feature 224 would be a tapered or rounded cone. To seat alignment features 224 and 244 and achieve the desired alignment, magnets 226 on connector 220 and magnets 246 on connector 240 create an attractive force that cause blind-mating of alignment features 224 and 244, which moves connectors 220 and 240 into aligned positions. Magnets 226 and 246 can be permanent magnets or may be electromagnets that are activated when connectors 220 and 240 need to be brought together or held together.

In one specific embodiment, each connector 220 or 240 contains four high flux magnets to draw connectors 220 and 240 together and also provide the force to hold connectors 220 and 240 in placed during use. When alignment features 224 are spherical, magnets 226 and 236 would generally be arranged in matching patterns, and the two magnet patterns would be aligned to provide maximum attractive force. However, for some shapes of alignment features 224 and 244, the magnet pattern on each connector 220 or 240 can be intentionally offset from one another to provide a force vector that drives the mating features 224 and 244 into a desired position. For example, if alignment features 224 and 244 implement a 'box in frame' alignment scheme, the pattern of magnets 226 may be the same as the pattern of magnets 246, but magnets 226 may be offset about 15% of the magnet diameter, so that the magnetic force pulls the 'box' connector into a corner of the frame. The specific implementation of alignment features 224 and 244 and magnets 226 and 246 can be varied widely while still keeping within the spirit of the current invention. For example, some magnets 226 or 246 may be replaced with iron or a ferric material that will still provide an attractive force to magnets in the other connector 220 or 240. Also, magnets 226 instead of being separate elements can be incorporated into other components of connector 220 or 240. For example, alignment features 224 on connector 220 can be magnetic balls that are attracted to magnets or ferric material located in holes 244 on connector 240. Many other configurations providing magnetic attraction are possible.

Alignment accuracy in x, y, z, tilt angles, and rotation angle θ is achieved through the use of at least three alignment features 224 that are shaped to fit into precision machined holes 244 only to a determined depth. Magnets 226 and 246 bringing connectors 220 and 240 together and also provide for the attractive force to hold connectors 220 and 240 in place. When connectors 220 and 240 are in close proximity as a result of plugging in adjacent blades or PCBs or operation of a latch mechanism as described further below, magnets 226 and 246 pull connectors 220 and 240 together, and alignment features 224 slide into prescribed holes 244 to prescribed depths. Alignment features 224, which can be given ball shapes, tapered shapes, or other similar shapes, cause connectors 220 and 240 to shift laterally as alignment features 224 are pushed into holes 244. The alignment features 224 and 244 further maintain a controlled spacing between the bodies of connectors 220 and 224. Thus, once in place, alignment features maintain alignment of light pipes 222 and 242 for transmission of free space optical signals. Optionally, connectors 220 and 240 can be encased in housings (not shown) with a mechanical latch that brings the connectors 220 and 240 together for the magnetic force to take over or to activate a spring force that pushes connectors 220 and 240 together. Preferably, connectors 220 and 240 are constructed using an optical bench assembly (e.g., a silicon optical bench or ceramic substrate), so that the precision alignment may be defined lithographically. Alternatively, connectors 220 and 240 may be formed using precision molds and aligned with other component during assembly. The alignment operations include the placement of the holes for precision balls or other alignment features, placement of micro lenses, placement of light pipes, and the placement of the fiber ribbon or other optical media.

Figure 2B:
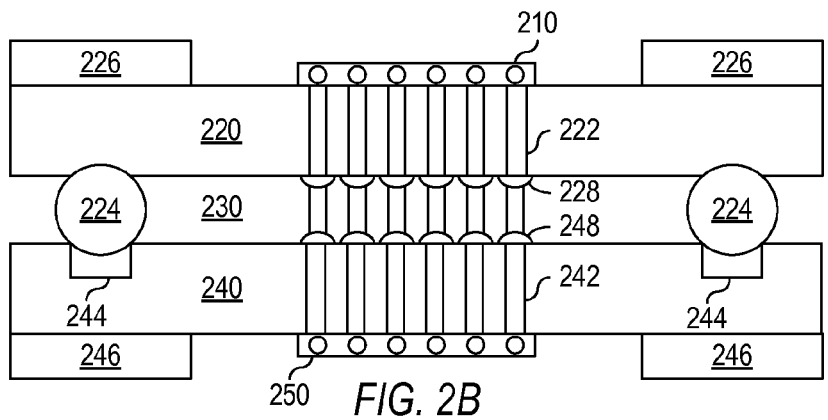
FIG. 2B shows a cross-sectional view of mated connectors in an embodiment of the invention employing lens arrays between the connectors.

FIG. 2B shows a cross-sectional view of an embodiment of connectors 220 and 240 when mated together as part of a free space proximity optical interconnect. As shown, when alignment features 224 of connector 220 are seated in alignment features 244 of connector 240, a gap 230 is maintained between the bodies of connectors 220 and 240. The relative size of features 224 and 244 control the separation between the bodies of connectors 220 and 240, and in a typical interconnect, gap 230 can be about 1 to 3 mm wide. The bodies of connectors can be on the order of about 2 to 3 mm thick, so that the total distance that light propagates between optical media 210 and optical media 250 can be on the order of 5 to 10 mm in a typical application. Accordingly, depending on the nature of light pipes 222 and 242, the optical signals may have up to about 1 cm of unguided propagation. An array of lenses 228 on connector 220 and an array of lenses 248 on connector 240 can be place in gap 230 at the ends of respective light pipes 222 and 242 to collimate or collect free space optical signals transmitted across gap 230. Lenses 228 and 248 can be used to expand and collect the free space beams crossing gap 230 and thereby relax the tolerance for misalignment of connectors 220 and 240.

Figure 2C:
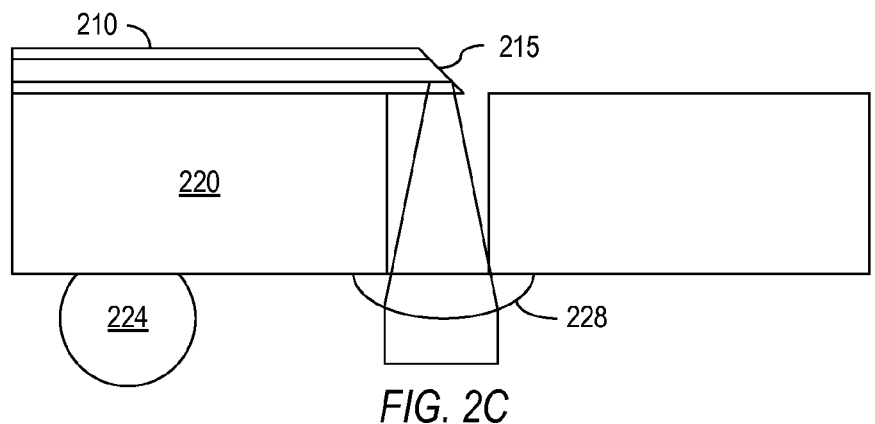
FIG. 2C shows illustrates the path of an optical signal in a connector for a free space proximity optical interconnect.

FIG. 2C illustrates the divergence of a transmitted beam from optical media 210 or convergence of a received signal at optical media 210 as a result of focusing by a lens 228. In the illustrated embodiment of FIG. 2C, optical media 210 is attached to a surface of the body of connector 220, and lens 228 is on the opposite surface of the body of connector 220. Light pipes 222 and 242 can be holes with reflective walls or waveguides running through the bodies of respective connectors 220 and 240 to limit the divergence of optical signals passing through the body of connector 220 or 244, and therefore permit the use of smaller lenses 228. Alternatively, the body of connector 220 can be transparent, and the size of lens 228 can be selected according to the expected divergence of signal beams.

Figure 3:
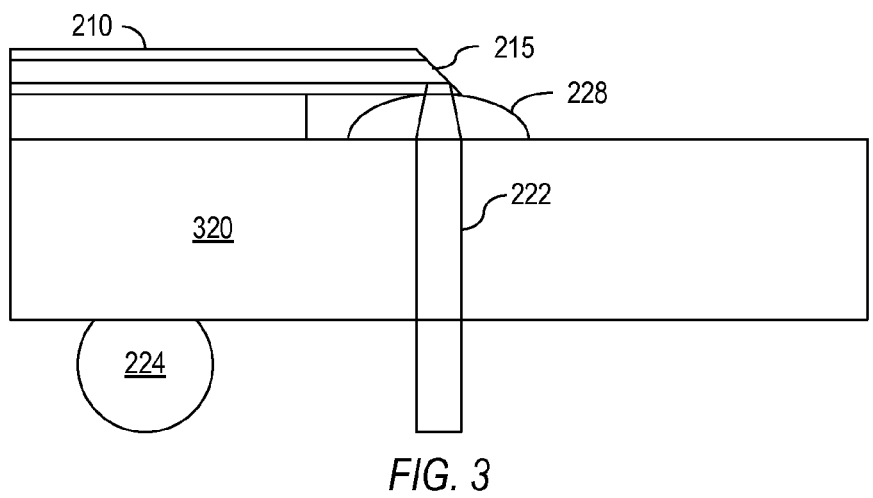
FIG. 3 shows cross-sectional views of a connector employing lens arrays adjacent to optical media that carry optical signals to and from the connectors.

FIG. 3 illustrates an alternative configuration for the optical system in a connector 320. In the configuration of FIG. 3, one or more lenses 228 are adjacent to respective fibers or waveguides in optical media 210. As a result, an optical signal reflected from the angled end surface 215 of optical media 210 will diverge less before being collimated by lens 228 and transmitted through the body of connector 320.

Figure 4:
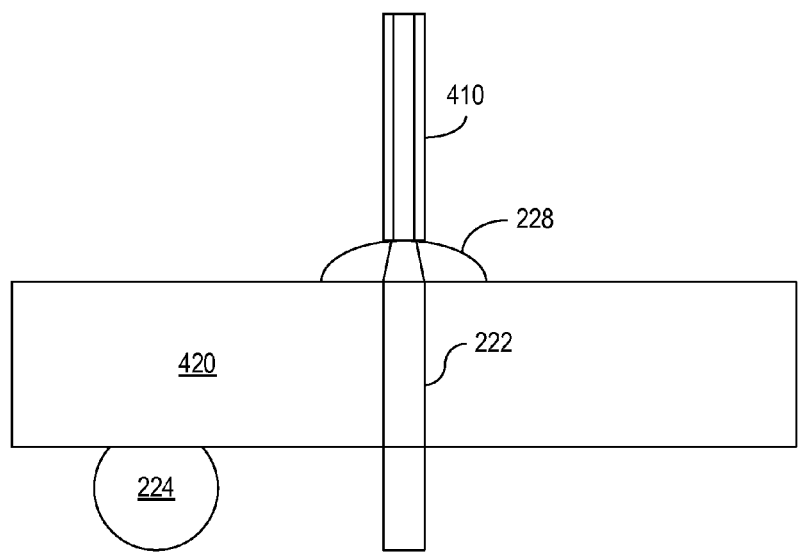
FIG. 4 shows cross-sectional views of a connector employing an optical media perpendicular to the body of connector.

FIG. 4 illustrates an embodiment of the invention in which an optical media 410 is perpendicular to the body of a connector 420. A lens 228 can then be positioned at the end of optical media 410 as shown or on the opposite side of the body of connector 220. The other elements in FIG. 4, e.g., alignment feature 224 and light pipe 222, can be substantially as described above.

Figure 5A:
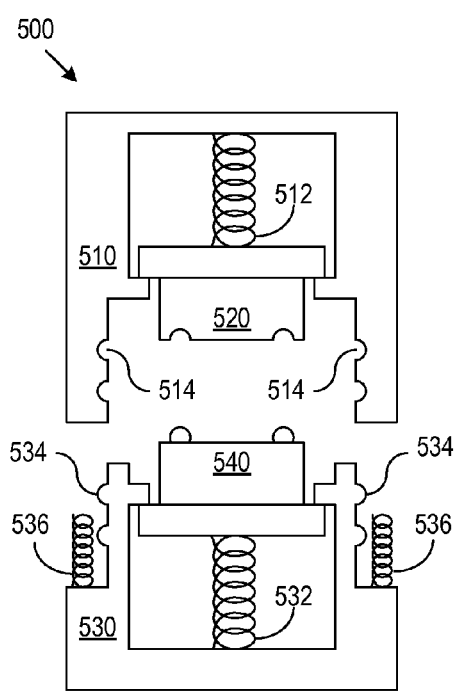
FIGS. 5A and 5B illustrate operation of a latch mechanism for connectors in accordance with an embodiment of the invention.

In accordance with a further aspect of the invention, the connectors for a free space proximity optical interconnect can be contained in a latch mechanism that uses springs to provide the forces that align the connectors and to provide force to assist separation of the connectors during component removal. FIG. 5A shows a latch system 500 in an unlatched configuration. Latch system 500 includes a first casing 510 containing a connector 520 and a second casing 530 containing a connector 540. Connectors 520 and 540 are connected to flexible optical media (not shown) can be similar or identical to the connectors described above with reference to FIGS. 2C, 3, and 4. Casing 510 includes a spring unit 512 on which connector 520 is mounted and notches 514 shaped to engage bumps 534 on casing 530. Casing 530 includes a spring unit 532 on which connector 540 is mounted, the bumps 534 shaped to engage notches 514, and release springs 536.

Figure 5B:
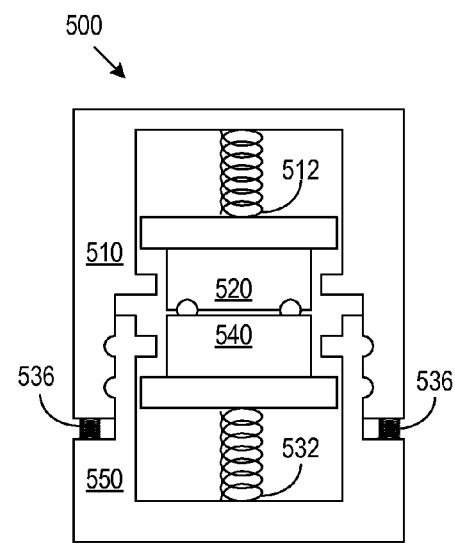

Latch mechanism 500 is engaged by pushing casing 530 into casing 510 until bumps 534 fit into respective notches 514 as shown in FIG. 5B. During the latching process, connectors 520 and 520 contact each other and spring mechanism 512 and 532 compress. Spring mechanisms 512 and 532 allow connectors 520 and 540 freedom of motion in x, y, z, rotation, and tilt, so that as the force applied to connectors 520 and 540 by spring mechanism 512 and 532 cause alignment features on connectors 520 and 540 to mate, connectors 520 and 540 can move into alignment for transmission of free space optical signals. In one embodiment of the invention, the alignment process relies entirely on spring forces to push connectors 520 and 540 together, so that magnets are not required on connector 520 or 540. Alternatively, magnets can be employed in addition to or in place of spring systems 512 and 534. In the embodiment where spring systems 512 and 514 are not used, the mountings of connectors 520 and 540 allow connectors to float in respective connectors 510 and 530, so that when connectors 520 and 540 are brought into close proximity, the magnets in connectors 520 and 540 can pull connectors 520 and 540 together and automatically align the free space optical channels.

The latching operation also compresses release springs 536 and causes a portion of casing 510 or 530 to flex as bumps 534 enter casing 510 and then spring back when bumps 534 seat in notches 514. Bumps 534, when seating in notches 514, hold casings 510 and 530 in place against the spring force of release springs 536. Flexing a portion of casing 510 or 530 can cause bumps 534 to unseat and allow release springs 536 to push casings 510 and 530 apart and overcome any magnetic attraction holding connectors 520 and 540 together.

Figure 6A:
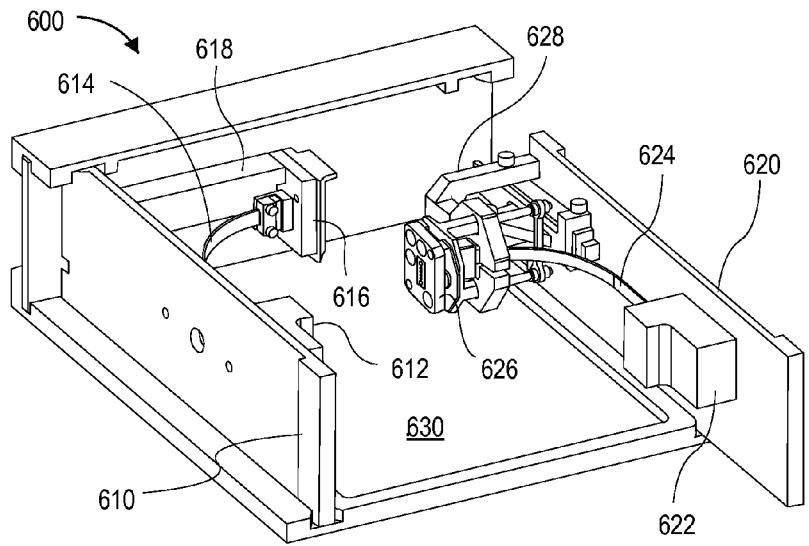
FIGS. 6A and 6B illustrate a system in which insertion of printed circuit boards can automatically create an optical interconnect across a separation parallel to the printed circuit boards.
Figure 6B:
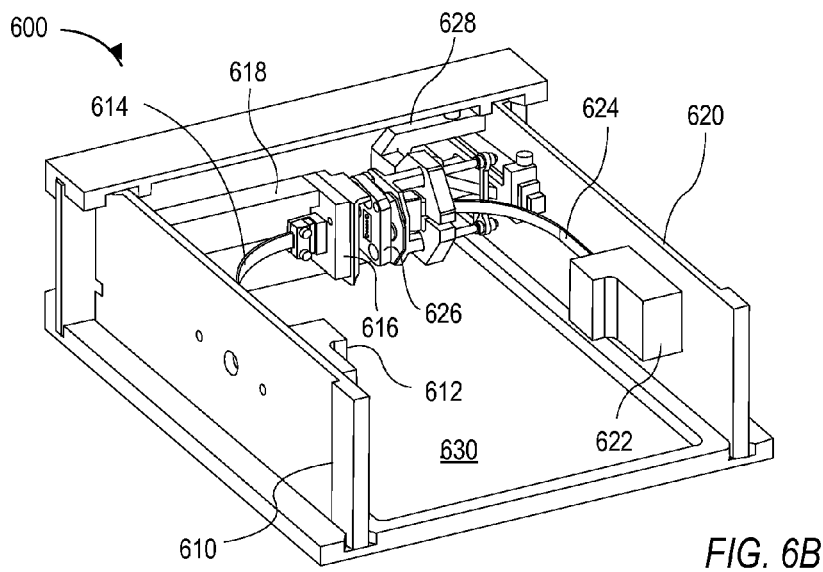

FIGS. 6A and 6B illustrate a system 600 in accordance with one specific embodiment of the invention employing a free space proximity optical interconnect. System 600 includes PCBs 610 and 620, which are designed to be inserted into slots built into a chassis 630. FIG. 6A shows system 600 with PCB 610 plugged into chassis 630 but before plugging in of PCB 620. FIG. 6B shows system 600 with both PCB 610 and PCB 620 plugged into chassis 630. PCB 610 includes electronic devices (not shown), an optical transceiver 612, and a fiber ribbon 614 that optically couples optical transceiver 612 to a connector 616 mounted on a stand-off structure 618. PCB 620 includes electronic devices (not shown), an optical transceiver 622, and a fiber ribbon 624 that couples optical transceiver 622 to a connector 626 mounted on a stand-off structure 628.

Figure 7:
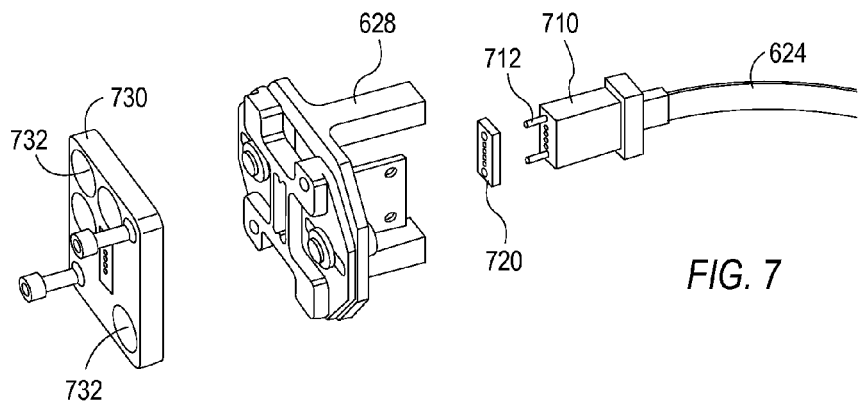
FIG. 7 shows an expanded view of a connector in accordance with an embodiment of the invention.

Fibber ribbon 614 and 624 offer several advantages for this proximity optical interconnect such as flexibility, light weight, and high bandwidth with minimal crosstalk. Fibber ribbons 614 and 624 may be made of glass or plastic fibers. In the case of plastic, the radius of curvature of ribbon 614 or 624 can be as small as 4 mm and still provide low loss of the optical signals. In one specific embodiment, fiber ribbons 614 and 624 are 12-channel, 50-μm multimode fiber ribbons and are attached to a ferrule in respective connectors 616 and 626. FIG. 7 shows a more detailed view of connector 626 in which a ferrule 710 is attached to fiber ribbon 624. Ferrule 710 has pins 712 that are cylindrical pins with radiused or chamfered ends and are positioned on either side of a fiber array. A commercially available, molded plastic lens assembly 720 (e.g., an Omron PL12A-C2) is then attached to the face of the fiber array. Lens array 720 can be fabricated with alignment holes that accept guide pins 712 that are part of ferrule 710. Simply by sliding lens array 720 onto guide pins 712, the individual lenslets in lens array 720 are aligned with corresponding fibers in ferrule 710. Precision plastic injection molding of lens array 720 and ferrule 710 results in nominal radial alignment errors that are typically less than about 5 μm. The axial alignment error is of a similar magnitude After lens array 720 is slid over guide pins 712, the combined assembly is slid through a portion of stand-off structure 628 and is loaded into a coupling plate 730. Once again, precise alignment between the fiber/lens assembly and coupling plate 730 can be achieved by placing guide pins 712 into precise holes formed in coupling plate 730. Coupling plate 630 contains alignment features which are the only portions of connector 626 that come into physical contact with connector 616. Precision alignment between the fiber array in ferrule 710, lens array 720, and coupling plate 730 is achieved by referencing all parts to the two very high precision guide pins 712.

Coupling plate 730 in this specific embodiment contains rare earth magnets 732 that are arranged in an asymmetric pattern helps provide force for automatic alignment of connectors 616 and 626. A total of eight neodymium rare earth magnets such as KJ Magnetics model D21B (diameter=4.75 mm, thickness=1.6 mm) in connectors 616 and 626 can generate the force of attraction between coupling plates 730. In the coupling plates of connectors 616 and 626 of FIGS. 6A and 6B, magnets 732 are arranged in mating pairs have a separation that produces a holding force of about 1.24 lbs per magnet pair. However, at their equilibrium position, the attracting magnets are slightly offset from each other. The overlap area is approximately 81%, so a final force is about 1.0 lb per pair, or 4.0 lb total for connectors 616 and 626. The attractive force decreases with the distance between connectors 616 and 618 in a predictable manner.

The specific version of the proximity free space optical interconnect shown in FIG. 6B utilizes a kinematically defined 'block-in-corner' mating system that can accommodate board to board misalignment of +/−3 mm in-plane, and +/−2.5 mm out of plane. The structure can also accommodate up to 5° of tilt and rotation misalignment between connectors 616 and 626. A variety of alternative coupling plate designs can be developed to accommodate specific ranges of misalignment magnitudes between mating PCBs. In general, connector size will increase as the magnitude of board to board positional tolerance increases, that is, as coupling plates are required to move over larger distances to accommodate the potential misalignment between PCBs.

The system optical design can also be made tolerant of misalignment resulting from individual piece part tolerances as well as position error between mating connectors 616 and 626. In particular, using commercially available optics for lens array 720 can operate with 2.5 mm spacing between lens apexes. The optical signals transits four separate air-lens interfaces during travels through the proximity optical interconnect, but even when lens array 720 are fabricated without AR coatings, total optical losses due to Fresnel reflections at these interfaces are only about 15%.

The fabrication and assembly tolerances associated with optical fiber ribbons 614 and 624 and ferrule 710 are extremely small. Ferrule 710 can be made from thermosetting or thermoplastic polymer material containing over 70 percent by volume loading of silica particles. Such material produces a dimensionally stable part with a low coefficient of thermal expansion (CTE). Dimensional accuracy can be further enhanced by using small molds with a low cavity count. In some cases a single cavity mold may be employed.

In a specific embodiment, plastic lens array 720 can be molded from an optical polymer with index of refraction of 1.505 for light with a wavelength of 850 nm. The dimensional accuracy of lens array 720 at room temperature is comparable to ferrule 710. However, because lens array 720 must be optically clear and free of internal interfaces, use of a CTE lowering filler material may not be practical. Therefore, over a typical temperature range of 0 to 85° C., lens array 720 could experience approximately 10 times the thermal growth and shrinkage of ferrule 710. Fortunately, because the guide pins 712 are fixed in the thermally stable ferrule material, the movement of guide pins 712 is limited, and guide pins 712 provide some resistance to thermally induced movement of lens array 720. This relative movement between lens elements and fibers should contribute additional misalignment of not more than 5 μm in the exemplary embodiment of the invention.

Figure 8A:
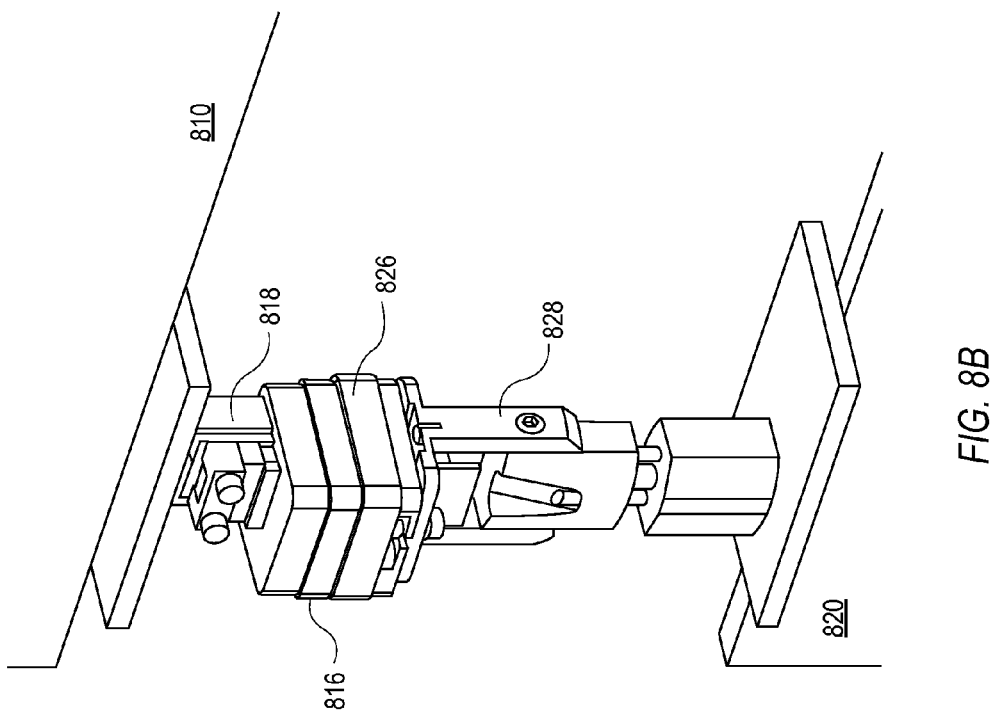
FIGS. 8A and 8B illustrate a system in which insertion of printed circuit boards can automatically create an optical interconnect across a separation between edges of the printed circuit boards.
Figure 8B:
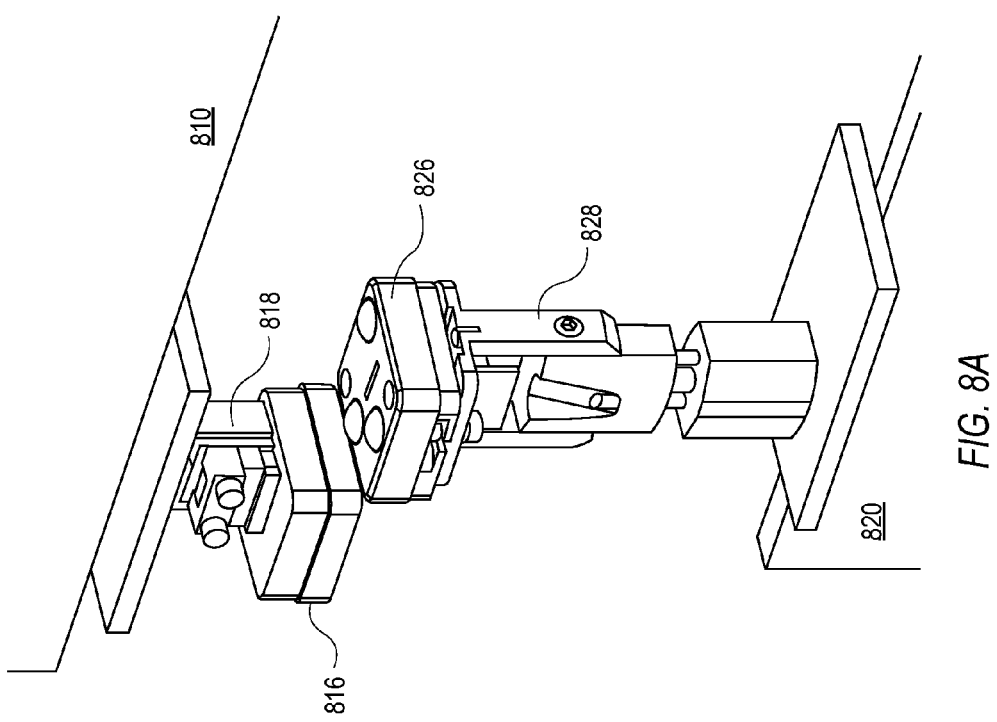

FIGS. 8A and 8B illustrate use of a proximity free space interconnect to provide communications between the edges of printed circuit boards 810 and 820 that reside in substantially the same plane. In FIG. 8A a printed circuit board 810 is in its working position and may be, for example, plugged into a chassis (not shown). A connector 816 is mounted on a standoff 818 that attaches at an edge of printed circuit board 810. Standoff 818 holds connector 816 but provides connector 816 sufficient freedom and range of motion in X, Y, Z, rotation angle, and two tilt angles for an automatic alignment operation. A flexible optical media (not shown) runs through standoff 818 and provides optical fibers or other waveguides between connector 816 and an optical transceiver (not shown) on board 810.

Printed circuit board 820 in FIG. 8A is ready for insertion into its working position, for example, by plugging printed circuit board 820 into the chassis to which printed circuit board 810 is connected. A connector 826 is mounted on a standoff 828 that attaches at an edge of printed circuit board 820. Standoff 828 holds connector 826 but provides connector 826 sufficient freedom and range of motion in X, Y, Z, rotation angle, and two tilt angles for automatic alignment with connector 816. A flexible optical media (not shown) runs through standoff 828 and provides optical fibers or other waveguides between connector 826 and an optical transceiver (not shown) on board 820.

The insertion of printed circuit board 820 into its working position as shown in FIG. 8B brings connector 826 of printed circuit board 820 into proximity with connector 816 of printed circuit board 810. When in proximity, an attractive force brings connectors 816 and 826 together, which causes mating of alignment features on connectors 816 and 826 and automatically aligns connectors 816 and 826 for transmission of optical signals. As described above, the attractive force that aligns connectors 816 and 826 can be created by magnets on one or both connectors 816 and 826.

Although the invention has been described with reference to particular embodiments, the description is only an example of the invention's application and should not be taken as a limitation. In particular, specific embodiments of the invention have been described in which printed circuit boards or other electrical systems have particular orientations. However, optical interconnects can be similarly established in other systems that are able to position suitable connectors in proximity for automatic alignment of optical channels. Various other adaptations and combinations of features of the embodiments disclosed are within the scope of the invention as defined by the following claims.

What is claimed is:

1. A system comprising:
a chassis;
a first blade for insertion in a slot of the chassis, the first blade including:
  a first optical media that is flexible and able to guide a plurality of optical signals; and
  a first connector optically coupled to the first optical media, the first connector having first alignment features and providing a plurality of first paths for the optical signals; and
a second blade for insertion in a slot of the chassis, the second blade including a second connector having second alignment features and providing a plurality of second paths for the optical signals, wherein:
the first connector and the second connector include components of a mechanism that brings the first connector and the second connector together when the first connector is near the second connector;
the chassis has first and second slots positioned so that the first blade being in the first slot and the second blade being in the second slot causes the mechanism to bring the first and second connectors together; and
the first alignment features are shaped to mate with the second alignment features and to shift at least one of the first connector and the second connector relative to the other connector into a seated position as the first connector and the second connector move toward each other, the first paths being aligned with the second paths when the first and second connectors are in the seated position.

2. The system of claim 1, wherein:
the first blade further comprises a first electronic system having a surface on which an optical transmitter is mounted, the first optical media being coupled to receive the optical signals from the optical transmitter; and
the second blade further comprises:
  a second electronic system in the second blade and having a surface on which an optical receiver is mounted, the surface of the second electronic system being substantially parallel to the surface of the first electronic system; and
  a second optical media connected to carry the optical signals between the second connector and the optical receiver.

3. The system of claim 2, wherein each of the first electronic system and the second electronic system comprises a printed circuit board.

4. The system of claim 2, wherein the first blade further comprises a standoff on which the first connector is mounted, wherein the standoff perpendicularly extends away from the surface of the first electronic system and provides the first connector with sufficient freedom of motion for automatic alignment with the second connector.

5. The system of claim 1, wherein the mechanism comprises an electromagnet or a permanent magnet mounted on at least one of the first connector and the second connector.

6. The system of claim 1, wherein the mechanism comprises a spring system on which the first connector is mounted.

7. The system of claim 1, wherein the mechanism further comprises a latch system including:
- a first unit in which the first connector is spring mounted; and
- a second unit in which the second connector is spring mounted, wherein:
- the first unit and the second unit are shaped to latch together in a configuration wherein spring mountings bring the first connector and the second connector together.

8. The system of claim 1, wherein the seated position of the first alignment features and the second alignment features leave a free space gap between the second paths and the first paths that are aligned with the second paths.

9. The system of claim 8, further comprising an array of lenses through which the optical signals propagate, the array of lenses being between the first optical media and the free space gap.

10. The system of claim 1, wherein the first alignment features are selected from a group consisting of balls, tapered cones, and rounded cones.

11. The system of claim 1, further comprising a mounting structure that constrains the first connector and the second connector while permitting relative movement in the x, y, z, rotation and tilt of the first connector and the second connector until the mechanism moves the first connector and the second connector into the seated position.

12. The system of claim 1, wherein the first optical media comprises a single-mode or multi-mode plastic fiber, glass fiber, nanostructured fiber, or polymer waveguide.

13. The system of claim 1, wherein the system is a computer server.

* * * * *